(12) United States Patent
Shea et al.

(10) Patent No.: US 6,439,174 B1
(45) Date of Patent: Aug. 27, 2002

(54) CRANKCASE VENTILATION SYSTEM

(75) Inventors: Dennis Shea, Grove City, PA (US); David Wright, Umatilla, OR (US); Shawn Gallagher, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/776,361

(22) Filed: Feb. 2, 2001

(51) Int. Cl.[7] .............................................. F01M 13/00
(52) U.S. Cl. ................................................... 123/41.86
(58) Field of Search ..................................... 123/41.86

(56) References Cited

U.S. PATENT DOCUMENTS

| | | |
|---|---|---|
| 4,557,226 A * 12/1985 | Mayer et al. | 123/41.86 |
| 4,901,703 A   2/1990 | Humphries | 123/572 |
| 4,958,613 A   9/1990 | Hiraoka et al. | 123/572 |
| 5,456,239 A  10/1995 | Henderson et al. | 123/563 |
| 5,669,366 A * 9/1997 | Beach et al. | 123/572 |
| 5,813,025 A * 9/1998 | Beucht | 123/41.86 |
| 6,123,061 A   9/2000 | Baker et al. | 123/573 |

* cited by examiner

Primary Examiner—Marguerite McMahon
(74) Attorney, Agent, or Firm—Carl A. Rowold; Polster, Lieder, Woodruff & Lucchesi, L.C.

(57) ABSTRACT

A crankcase ventilation system for a turbocharger internal combustion engine comprises an internal combustion engine having a crankcase and an exhaust stack, a turbocharger for providing a supply of pressurized air to the engine, eductor tubing connected between the crankcase and the exhaust stack for ventilating the crankcase, and a conduit connected between the turbocharger and eductor tubing.

15 Claims, 2 Drawing Sheets

CRANKCASE VENTILATION SYSTEM

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to a crankcase ventilation system in an internal combustion engine, and more particularly, to a crankcase ventilation system for a turbocharger internal combustion engine for increasing pressure to properly ventilate crankcase gases.

Internal combustion engines, which may be gasoline or diesel powered, produce combustion gas which is blown out of an engine combustion chamber into a crankcase through a small clearance between a piston and a cylinder. Additionally, compressed air may leak through oil seals to be circulated within the crankcase. This results in blow-by gas being produced within the crankcase which requires venting. The blow-by gas consists of a pressurized mixture of air, exhaust gas, and oil. The blow-by gas causes deterioration of engine lubricating oil within the crankcase and oil seals within the engine. If the blow-by gas is left unvented and the oil seals are allowed to deteriorate, then engine oil will leak through the engine and into the exhaust system. Sufficient ventilation of the blow-by gas is required and is typically accomplished by use of an eductor tubing. An eductor tubing is connected between the crankcase of the engine and the exhaust stack. The eductor tubing provides a vacuum which vents blow-by gas from the crankcase to the exhaust stack. However, over time, due to engine wear, deterioration of parts within the engine, and other conditions, the vacuum created with use of the eductor tubing decreases due to the increase in the volume of air and gas in the crankcase. The vacuum created decreases to such an extent that the blow-by gas may not be properly ventilated from the crankcase. If this persists, then damage may occur to the engine in the form of damage to the crankcase pan, oil leaking or being burned into the atmosphere, or complete engine failure. In order to prevent the decrease in vacuum due to engine wear or other factors, it would be advantageous to compensate for this decrease in vacuum.

BRIEF SUMMARY OF THE INVENTION

Briefly stated, a crankcase ventilation system for a turbocharged internal combustion engine is provided which comprises an internal combustion engine having a crankcase for holding lubricating oil and receiving blow-by gas and an exhaust stack for receiving exhaust gas from the engine and directing it away from the engine, a turbocharger for providing a supply of pressurized combustion air to the engine, eductor tubing connected between the crankcase and the exhaust stack for ventilating the crankcase, and a conduit extending between the pressurized side of the turbocharger to a point adjacent the eductor tubing for directing pressurized gas to flow in fluid communication with the eductor tubing for increasing vacuum.

In one aspect, a crankcase ventilation system for a turbocharger internal combustion engine is provided which comprises an internal combustion engine having a crankcase and an exhaust stack, a turbocharger for providing a supply of pressurized combustion air to the engine, eductor tubing connected between the crankcase and the exhaust stack for creating vacuum for ventilating the crankcase, and a conduit for directing a portion of the pressurized air from the turbocharger to flow in fluid communication with the eductor tubing for increasing vacuum.

In another aspect, a kit for retrofitting a turbocharger internal combustion engine having a crankcase, an exhaust stack, a turbocharger for providing a supply of pressurized intake air to the engine, and eductor tubing connected between the crankcase and the exhaust stack for ventilating the crankcase is provided which comprises a conduit for connecting between the turbocharger and to a point adjacent the eductor tubing, the conduit having a first end and a second end, and a connector for connecting the first end of the conduit to the turbocharger and a second connector for connecting the second end of the conduit to eductor tubing.

A method for increasing crankcase vacuum for a turbocharger internal combustion engine having a crankcase, an exhaust stack, a turbocharger for providing a supply of pressurized intake air to the engine, and eductor tubing connected between the crankcase and the exhaust stack for ventilating the crankcase is provided which comprises directing combustion air from the turbocharger to flow in fluid communication with the eductor tubing for increasing vacuum.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
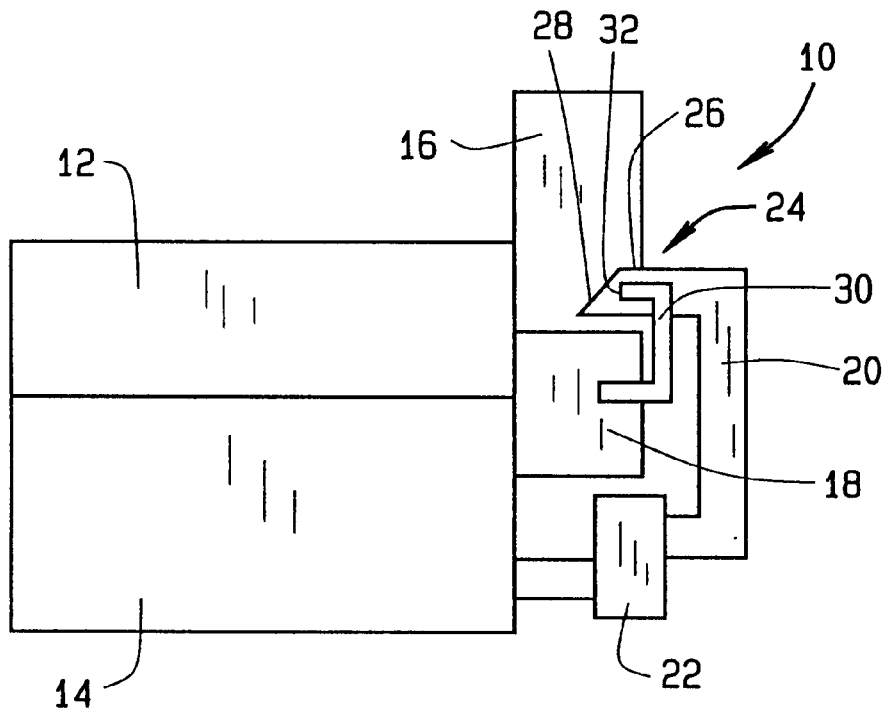
FIG. 1 is a schematic representation of a crankcase ventilation system for a turbocharger internal combustion engine constructed according to the present invention.

With reference now to FIG. 1, a crankcase ventilation system 10 is illustrated comprising an internal combustion engine 12 having a crankcase 14 and an exhaust stack 16. The system 10 also has a turbocharger 18 for providing a supply of pressurized air to the engine 12. Although not shown, the turbocharger 18 may also include an intercooler. Eductor tubing 20 is connected between the crankcase 14 and the exhaust stack 16 for ventilating blow-by gas from the crankcase 14. A separator 22, such as an oil separator or filter, may be connected in line with the eductor tubing 20 for filtering out any oil from the gas being vented from the crankcase 14. The crankcase 14 is used to hold lubricating oil and to receive blow-by gas from the engine 12. The exhaust stack 16 is used to receive exhaust gas under pressure and to direct the gas away from the engine 12.

The eductor tubing 20 comprises an exhaust eductor section 24 which is elbow shaped and also comprises an exhaust eductor pipe 26 having an end 28 cut off at an angle. The pipe 26 and the end 28 are positioned within the exhaust stack 16. Exhaust flow in the exhaust stack 16 moves past the end 28 and creates a vacuum in eductor tubing 20. The vacuum in eductor tubing 20 draws gasses, such as blow-by gas, from the crankcase 14 through the oil separator 22 to be ejected into the exhaust stack 16. Eductor tubing 20 creates a slight vacuum, about 1 to 5 inches of water, in the crankcase 14 which is used for evacuating gases and preventing oil leaks from the crankcase 14. Eductor tubing 20 may comprise a tube or a hose and the exhaust eductor section 24 may be separate from eductor tubing 20. The exhaust eductor section 24 serves as an eductor air inlet and the pipe 26 functions as an eductor air outlet.

The crankcase vacuum created by eductor tubing 20 is very sensitive to the flow of gas being evacuated from the crankcase 14. As more air is introduced into the crankcase 14, such as by deterioration of oil seals, leaks in the crankcase 14, compressed air passing a seal in the turbocharger 18, or by engine 12 aging and component wear, the vacuum created by eductor tubing 20 is reduced. This additional flow requiring evacuation or ventilation from the crankcase 14 reduces the vacuum created by eductor tubing 20 to a point where it will be positive pressure.

In order to provide additional vacuum to eductor tubing 20, a conduit or hose 30 is connected between the compressed air side or the pressurized side of the turbocharger 18 and to a point adjacent to the eductor tubing 20 for directing pressurized gas to flow in fluid communication with the eductor tubing 20 for increasing vacuum. The conduit 30 has an orifice 32 which is positioned along an axis of the eductor pipe 26. A small amount of high pressure air is sprayed through the orifice 32. The high velocity air from the turbocharger 18 mixes with the gas from the crankcase 14 and this increases the flow rate of the mixture through the eductor pipe 26. As a result, additional suction or vacuum is provided to the crankcase 14 which is proportional to the compressed air pressure and the speed of the turbocharger 18. The orifice 32 is calibrated or sized to optimize the vacuum of the crankcase 14 or to properly ventilate gas from the crankcase 14. The amount of pressurized air being diverted from the turbocharger 18 is minimal so as not to impact the fuel efficiency of the engine 12. Further, since the compressed air being diverted from turbocharger 18 is accomplished prior to the intercooler, the conduit 30 must be able to withstand temperatures of up to 400° F.

Although the conduit 30 has been described as being positioned prior to the intercooler associated with the turbocharger 18, it is also possible and contemplated to position the conduit 30 after the intercooler. This would require that the length of the conduit 30 be longer and additional clamping be used to connect the conduit 30 to or near the intercooler. In this particular arrangement, the pressured air would be diverted from the intercooler to the orifice 32. The conduit 30 is used to provide additional vacuum to eductor tubing 20.

Figure 2:
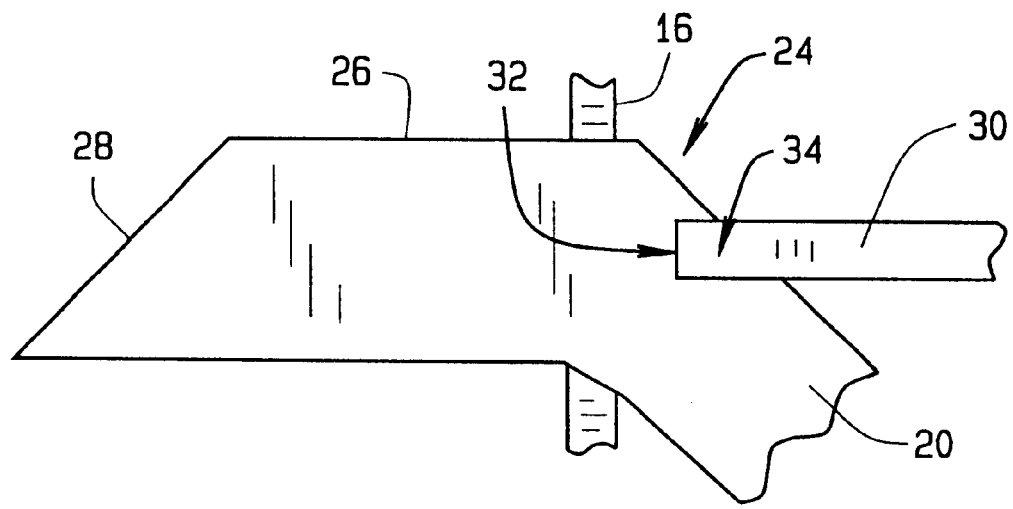
FIG. 2 is an enlarged partial schematic representation of a conduit of the crankcase ventilation system.

FIG. 2 depicts an enlarged partial schematic representation of the conduit 30 of the crankcase ventilation system 10. The conduit 30 has an end 34 which is inserted into the eductor 24 of eductor tubing 20. The end 34 has the orifice 32 which is positioned within the eductor 24 and along an axis of the eductor 24. Although not shown, another end of the conduit 30 is connected to or in flow communication with the turbocharger 18. Eductor tubing 20 is also illustrated being positioned outside of the exhaust stack 16. The eductor 24 has the pipe 26 inserted into the exhaust stack 16 with the end 28 being cut off at an angle. With this construction, a small amount of pressurized air is diverted from the turbocharger 18 to provide additional vacuum in eductor tubing 20. The pressurized air from the turbocharger 18 is sprayed through the orifice 32 and mixed with the gas from the crankcase 14. Examples of the conduit 30 include hoses, pipes, tubing, or any suitable conduit which allows air to flow therein.

Figure 3:
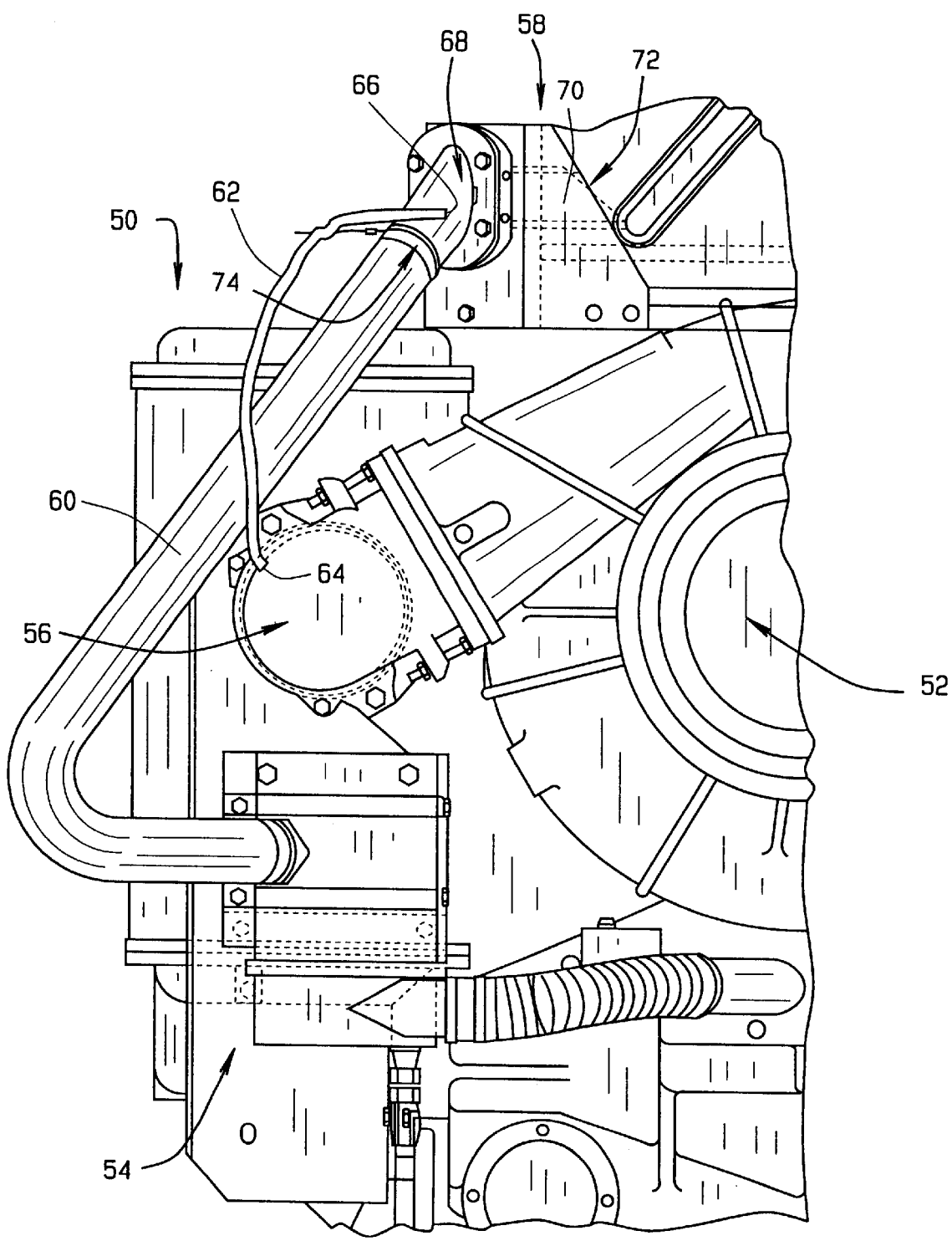
FIG. 3 is a diagrammatic representation of a crankcase ventilation system for a turbocharged internal combustion engine constructed according to the present invention.

Referring now to FIG. 3, a crankcase ventilation system 50 is shown which may be employed in a kit form to retrofit an existing engine 52, such as a locomotive diesel turbocharger engine. The crankcase ventilation system 50 is used to provide additional vacuum for ventilating a crankcase 54 of the engine 52. The engine 52 also comprises a turbocharger 56 and an exhaust stack 58. Eductor tubing 60 is connected between the crankcase 54 and the exhaust stack 58. A conduit 62, such as a hose or other suitable tubing, is provided having a first end 64 and a second 66. Eductor tubing 60 is also shown to have an elbow shaped eductor 68 having an exhaust eductor pipe 70 having an angled end 72 within the exhaust stack 58. The first end 64 of the conduit 62 is clamped, connected, or attached to the turbocharger 56 and the second or other end 66 of the conduit 62 is connected to eductor tubing 60 or to the eductor 68. It may be necessary to drill holes into the turbocharger 56 and eductor tubing 60 or the eductor 68 in order to insert the conduit 62. Further, various seals may be used to seal both ends 64 and 66 of the conduit 62 to prevent air from escaping. As discussed previously, the eductor 68 may be separate from eductor tubing 60. For example, a suitable connector 74 may be used to connect or interface eductor tubing 60 and the eductor 68 together.

The end 66 of the conduit 62 is inserted into the eductor 68. Although not shown, the end 66 has an orifice which is positioned along an axis of the eductor 68. The orifice is used to spray pressurized air from the turbocharger 56 into the eductor 68. The high velocity air is mixed with the gas from the crankcase 54 and this increases the flow rate of the mixture through the eductor 68. This results in additional suction or vacuum to properly ventilate gas from the crankcase. As discussed previously, the orifice is calibrated or sized to optimize the vacuum of the crankcase 54. Additionally, the conduit 62 may be a predetermined length or the length may be adjusted by cutting one or both of the ends 64 and 66 to size. For example, the length of the conduit 62 may need to be adjusted or cut to span the distance between where the turbocharger 56 is located and where the eductor 68 of eductor tubing 60 is positioned. Further, the end 64 of the conduit 62 may be connected after the intercooler (not shown) instead of the turbocharger 56.

Accordingly, a technical effect of the disclosed crankcase ventilation system is to increase the vacuum in a crankcase of a turbocharger internal combustion engine. The crankcase ventilation system of the present invention with its increased vacuum capability may be applied in a turbocharger internal combustion engine, such as a turbocharger diesel engine, where effective ventilation of blow-by gas from a crankcase is required.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A crankcase ventilation system for a turbocharged internal combustion engine comprising:

an internal combustion engine having a crankcase for holding lubricating oil and receiving blow-by gas and an exhaust stack for receiving exhaust gas under pressure and directing it away from the engine;

a turbocharger for providing a supply of pressurized combustion air to the engine;

eductor tubing connected between the crankcase and the exhaust stack for ventilating the crankcase; and a conduit extending between the pressurized side of the turbocharger and to a point adjacent to the eductor tubing for directing pressurized gas to flow in fluid communication with the eductor tubing for increasing vacuum, the conduit comprising an end having an orifice open to the eductor tubing with the orifice being positioned generally along an axis of the eductor tubing for directing a stream of pressurized air to flow generally along the axis of the eductor tubing toward an open end of the eductor tubing.

2. The crankcase ventilation system of claim 1 wherein the conduit comprises an end having an orifice open to the eductor tubing.

3. The crankcase ventilation system of claim 1 wherein the orifice is sized to increase vacuum between the crankcase and eductor tubing.

4. The crankcase ventilation system of claim 1 wherein the conduit comprises another end which opens to the pressure side of the turbocharger to direct a portion of the pressurized air from the turbocharger.

5. The crankcase ventilation system of claim 1 wherein the eductor tubing has an angled end which opens into the exhaust stack to create vacuum to ventilate the crankcase.

6. The crankcase ventilation system of claim 5 wherein the increased vacuum is proportional to the compressed air pressure and the speed of the turbocharger.

7. The crankcase ventilation system of claim 1 wherein the conduit comprises an end having an orifice which is sized to ventilate the crankcase.

8. A kit for retrofitting a turbocharger internal combustion engine having a crankcase, an exhaust stack, a turbocharger for providing a supply of pressurized intake air to the engine, and eductor tubing connected between the crankcase and the exhaust stack for ventilating the crankcase, the kit comprising a conduit for connecting between the turbocharger and eductor tubing, the conduit having a first end and a second end, and a first connector for connecting the first end of the conduit to the turbocharger and a second connector for connecting the second end of the conduit to eductor tubing, the second end of the conduit having an orifice open to the eductor tubing with the orifice being positioned generally along an axis of the eductor tubing for directing a stream of pressurized air to flow generally along the axis of the eductor tubing toward an open end of the eductor tubing.

9. The kit of claim 8 wherein the conduit has a predetermined length which spans the distance between the turbocharger and eductor tubing.

10. The kit of claim 8 wherein the conduit has a length and the length is adjustable to span the distance between the turbocharger and eductor tubing.

11. The kit of claim 8 wherein the connectors comprise clamps.

12. The kit of claim 8 wherein the connectors comprise seals.

13. A method for increasing crankcase vacuum for a turbocharged internal combustion engine having a crankcase, an exhaust stack, a turbocharger for providing a supply of pressurized intake air to the engine, and eductor tubing connected between the crankcase and the exhaust stack for ventilating the crankcase, the method comprising the steps of directing pressured combustion air from the turbocharger to the eductor tubing through a conduit and exiting as a stream flowing generally along the axis of the eductor tubing toward an open end of the eductor tubing.

14. The method of claim 13 further comprising the step of sizing the orifice to properly ventilate gas from the crankcase.

15. The method of claim 13 further comprising the step of sizing the orifice to increase vacuum between the crankcase and eductor tubing.

* * * * *